(12) United States Patent
Abernathy et al.

(10) Patent No.: US 9,446,851 B2
(45) Date of Patent: Sep. 20, 2016

(54) LANDING HAZARD AVOIDANCE DISPLAY

(71) Applicants: Rapid Imaging Software, Inc., Albuquerque, NM (US); NASA, Houston, TX (US)

(72) Inventors: Michael Franklin Abernathy, Albuquerque, NM (US); Robert L. Hirsh, Houston, TX (US)

(73) Assignees: Rapid Imaging Software, Inc., Albuquerque, NM (US); National Aeronautics and Space Administration, Houston, TX (US)

( * ) Notice: Subject to any disclaimer, the term of this patent is extended or adjusted under 35 U.S.C. 154(b) by 0 days.

(21) Appl. No.: 14/546,723

(22) Filed: Nov. 18, 2014

(65) Prior Publication Data

US 2016/0137309 A1    May 19, 2016

(51) Int. Cl.
  *B64D 43/00*    (2006.01)
(52) U.S. Cl.
  CPC .................... *B64D 43/00* (2013.01)
(58) Field of Classification Search
  CPC ............ G01F 23/0061; G01F 23/266; G01N 27/221; G01N 33/28; G08B 29/24; H02J 9/06; B06B 1/02; B64C 2201/141; G01B 7/00; G01C 21/00; G01C 21/20; G01H 11/06; G01H 3/00; G05B 19/0423; G05B 2219/2101

USPC ....... 340/947, 974, 945–946, 948, 961, 963, 340/959, 960, 967, 971–973, 990–994, 340/995.1
See application file for complete search history.

(56) References Cited

U.S. PATENT DOCUMENTS

| | | | |
|---|---|---|---|
| 7,363,157 B1* | 4/2008 | Hanna ................... | G01C 11/00 702/5 |
| 8,744,126 B1* | 6/2014 | Rohrschneider ......... | G06K 9/44 382/100 |
| 2002/0080138 A1* | 6/2002 | Tarr ....................... | G06T 17/05 345/441 |
| 2010/0117867 A1* | 5/2010 | He ......................... | G01C 23/00 340/974 |
| 2012/0181388 A1* | 7/2012 | Cowley ................. | B64C 11/002 244/175 |
| 2014/0343765 A1* | 11/2014 | Suiter ................... | G08G 5/0056 701/18 |

* cited by examiner

*Primary Examiner* — Daniel Previl
(74) *Attorney, Agent, or Firm* — Richard H. Krukar; Kermit D. Lopez; Luis M. Ortiz

(57) ABSTRACT

Landing hazard avoidance displays can provide rapidly understood visual indications of where it is safe to land a vehicle and where it is unsafe to land a vehicle. Color coded maps can indicate zones in two dimensions relative to the vehicles position where it is safe to land. The map can be simply green (safe) and red (unsafe) areas with an indication of scale or can be a color coding of another map such as a surface map. The color coding can be determined in real time based on topological measurements and safety criteria to thereby adapt to dynamic, unknown, or partially known environments.

20 Claims, 4 Drawing Sheets

LANDING HAZARD AVOIDANCE DISPLAY

STATEMENT OF GOVERNMENT INTEREST

This invention described herein was made in part by an employee of the United States Government and was made with government support under contract numbers NNX09CB10C and NNX08CC40P awarded by NASA. The invention described herein may be manufactured and used by or for the Government of the United States of America for governmental purposes without the payment of any royalties thereon or therefor.

TECHNICAL FIELD OF THE INVENTION

Embodiments relate to navigation, aviation, and avionics for landing aircraft, spacecraft, and submarines. In particular, embodiments relate to display of information to allow an impromptu selection of a hazard-free landing site.

BACKGROUND

Prior art landing hazard displays concentrate on showing a user the actual hazards present in landing zones. For example, tall buildings, antennae, and power lines can be indicated such that a pilot or remote operator can take notice and avoid the hazard. Such hazard displays are incredibly valuable and have doubtless played a role in making air travel safer than highway travel. In a similar manner, spacecraft can be landed more reliably when the hazards around a selected landing zone are clearly marked. Spacecraft landing hazards tend to be mountains, craters, chasms, and other geological features.

Detecting or viewing hazards in landing zones is most crucial in the final stages of landing an aircraft or spacecraft because it is at this time that hazards in the landing area are most detectable and mishaps most imminent. Traditional displays like synthetic vision systems do not provide the necessary depth cues to allow pilots to assess risk from obstacles quickly and accurately. Systems and methods that aid users in rapidly understanding the hazard environment using two two-dimensional maps are needed, particularly when the user must quickly select a hazard free landing site.

BRIEF SUMMARY

Aspects of the embodiments address limitations and flaws in the prior art by producing color coded hazard maps that are rapidly understandable. It has been determined in practice that color coded two-dimensional surface maps are usually understood more rapidly than three dimensional displays.

It is therefore an aspect of the embodiments that a vehicle moving along a flight path can measure the topology of the surface along the flight path. An aircraft can use LIDAR, RADAR, or related technologies to measure the topology. Regular imaging such as video can be used, but is less capable of measuring the surface profile than other technologies. A submarine can use a variety of technologies including SONAR. Here, a submarine is treated as a vehicle that flies through the water.

It is another aspect of the embodiments that safety criteria describe safe or unsafe surface topologies or other conditions. For an aircraft, the surface topology is the land surface and can include measurements of elevation as well as measurements of ground clutter such as bushes. For submarines, the surface is the sea bottom and may also indicate ground clutter. The ability to sense clutter and differentiate it from the ground is a property of the sensing platform.

The safety criteria includes at least one topological criterion. A topological criterion is a description of surface topology that is safe to land on or that is unsafe to land on. For example, the ground slope is a good criterion because it is usually unsafe to attempt landing on the edge of a cliff or steep mountainside. Similarly, a relatively flat area can be ideal for a vehicle capable of vertical landing. An aircraft requiring a landing strip can safely land on a flat surface with a minimum length of flat surface behind the landing point. Note that runway length can be adjusted up or down due to ground slope and other conditions.

Another topological criterion can indicate if a vehicle can relaunch or take back off from a landing site. For example, surface elevation or air pressure is a good indicator if an aircraft, particularly a helicopter, can take off again. Such a criterion can use a default vehicle weight or can account for fuel levels or cargo weights. If known, a prevalent air pressure or predicted air pressure can be used to help determine if the vehicle will probably be able to relaunch.

Yet other safety criteria can be based on other physical properties of the vehicle such as width, weight, ability to handle rough surfaces, propensity to being damaged by ingesting things into the engines, and other factors.

An additional safety criteria can be the presence of transient hazards such as other vehicles. For example, a hot air balloon floating past can cause much of the terrain on the far side of the balloon to be unsafe for landing. As the balloon moves, some terrain becomes safe and other terrain becomes unsafe. The safety criteria in such a scenario most likely provides for a safety exclusion zone or envelope around the balloon. Other vehicles should avoid flying within the envelope or exclusion zone because otherwise they get too close to the balloon.

It is yet another aspect of the embodiments to apply the safety criteria to the topology measurement. A geographical area meeting a "safe" criteria can be marked or color coded as "safe." A geographical area meeting an "unsafe" criteria can be marked or color coded as "unsafe." Some embodiments can have only "safe" criteria with everywhere not meeting the criteria being unsafe by default. Similarly, other embodiments can have only "unsafe" criteria. Embodiments can use both "safe" and "unsafe" criteria to definitively mark areas as safe or unsafe while leaving the remaining areas as either unmarked, not color coded, or color coded as "neutral." Certain embodiments can also have an "unknown" coding for geographic areas for which the topological measurements or data is insufficient. The color codes themselves can be a default set that everyone uses or can be set by user preference. For example, red can indicate unsafe, green safe, grey neutral, and black unknown.

A further aspect of the embodiments is that the hazard map is presented to a person such as the vehicles pilot. The hazard map can be updated as the vehicle moves or outside conditions, such as a moving balloon, change. As with other map displays currently in use, the hazard display can be set relative to the outside such as north always at the top of the map or can be set relative to the vehicle flight path such as the top of the map being the direction of travel.

The hazard map can be a simple display having little more than, for example, red areas, green areas, and an indicator of the vehicles position. The hazard map can be a colorization of a surface map such that the user can see ground detail. For example, a surface map can be a grey scale rendering of the surface topology or surface features. Unsafe areas can use different shades of red instead of grey whereas safe areas can use shades of green. Other colorizations include tinting and colored partially transparent overlays.

The hazard map can be two dimensional or three dimensional and, as discussed above, can include surface detail. Similarly, the hazard map can be displayed in two or three dimensions. To date, the two dimensional embodiments have been preferable because of ease of understanding and the prevalent display technologies.

Of further note, the hazard display can have sufficiently fine resolution that very small safe spots or unsafe can be indicated. For example, a vehicle with landing pads can land wherever its pads touch green (safe), even if much of the terrain is red (unsafe). Similarly, that same craft can be rotated or shifted slightly to avoid putting a pad in a red spot.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

Landing hazard avoidance displays can provide rapidly understood visual indications of where it is safe to land a vehicle and where it is unsafe to land a vehicle. Color coded maps can indicate zones in two dimensions relative to the vehicles position where it is safe to land. The map can be simply green (safe) and red (unsafe) areas with an indication of scale or can be a color coding of another map such as a surface map. The color coding can be determined in real time based on topological measurements and safety criteria to thereby adapt to dynamic, unknown, or partially known environments.

Figure 1:
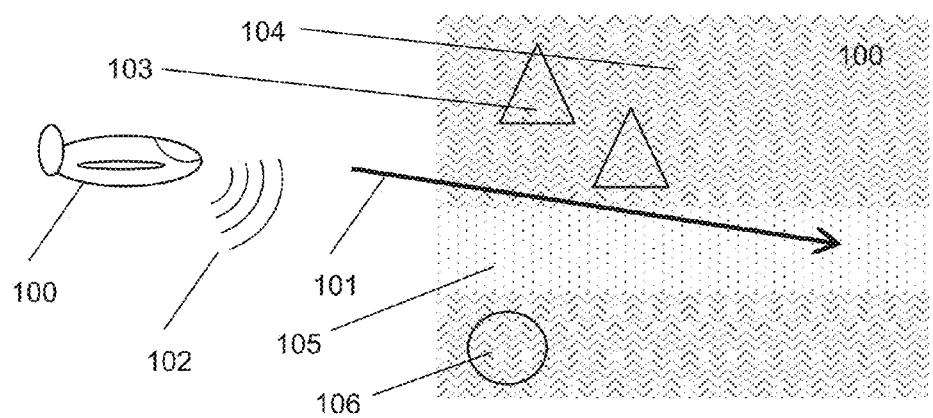
FIG. 1 illustrates a vehicle sensing the geographic topography along its flight path and producing a two dimensional hazard map in accordance with aspects of the embodiments.

FIG. 1 illustrates a vehicle 10 sensing the geographic topography along its flight path 101 and producing a two dimensional hazard map 100 in accordance with aspects of the embodiments. As the vehicle 10 travels along its flight path 101, the vehicle's topology sensing platform emits signals 102 that are reflected by the terrain 103 and, in some embodiments, aerial hazards 106. The reflected signals are analyzed and a two dimensional hazard map 100 is produced. The hazard map shows areas that are unsafe for landing 104 and areas that are safe for landing 105. In this exemplary embodiment, different fill patterns are used to indicate the different areas. In practice, color displays are available that provide for color coding such that safe areas can be coded green and unsafe ones coded red. As such, "color coded" is used herein to indicate coding with colors, fill patterns, and shades.

Figure 2:
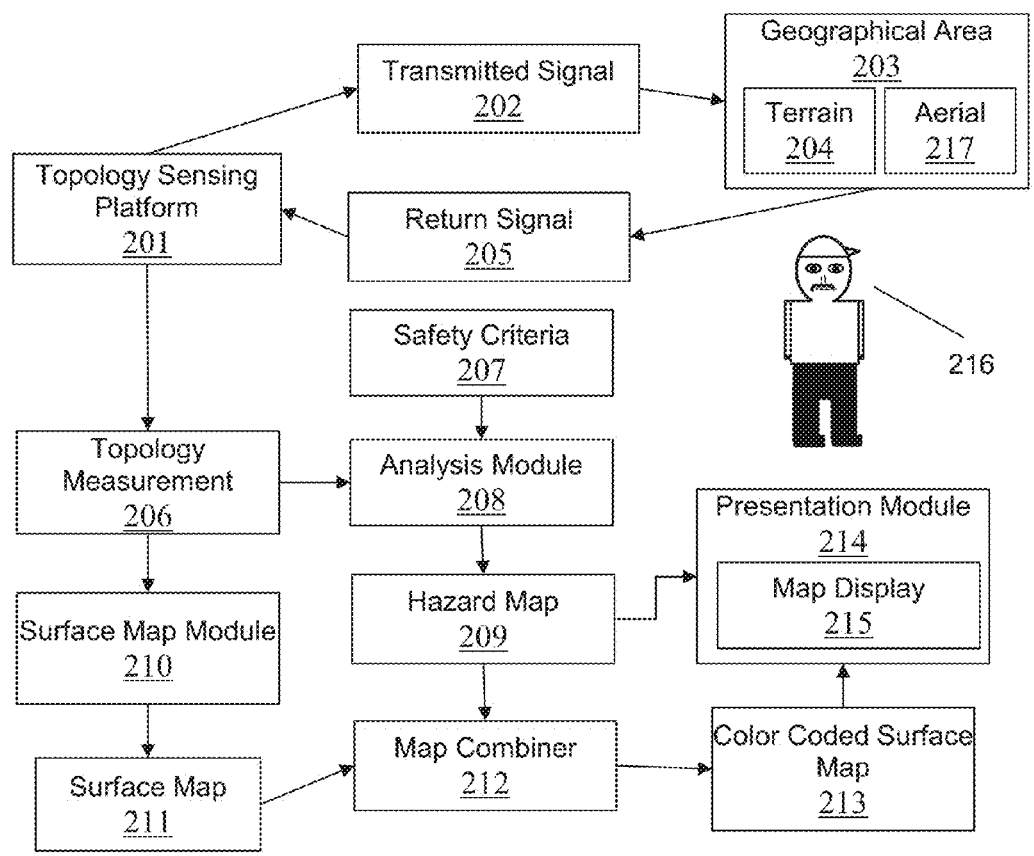
FIG. 2 illustrates a high level block diagram of sensing geographic topology and producing a color coded hazard map in accordance with aspects of the embodiments.

FIG. 2 illustrates a high level block diagram of sensing geographic topology and producing a color coded hazard map 213 in accordance with aspects of the embodiments. A topology sensing platform 201 transmits a signal 202 toward a geographic area 203 that can be reflected and scattered by terrain 204 and aerial hazards 217 to produce a return signal 205. The topology sensing platform 201 receives and interprets the return signal 205 and produces a topology measurement 206. The topology measurement 206 can take the form of a two dimensional array of 3 dimensional coordinates indicating, for example, longitude, latitude, and elevation. Latitude, longitude, and elevation are typically considered absolute measurements while in practice the coordinates can be referenced relative to an arbitrary position in space, on the ground, or perhaps even the vehicle's position.

The topology measurement 206 can be used for numerous purposes. A surface map module 210 can interpret the topology measurement 206 and produce a surface map 211. A surface map 211 can be useful when a stored surface map is not available, is of too low a resolution or quality, is outdated, or is deficient in some other manner. The surface map 211 can also be correlated with a stored surface map to better determine the vehicle's position. The topology measurement 206 can also be submitted to an analysis module 208 that interprets the topology measurement 206 based on safety criteria 207 to determine geographic areas where the vehicle can safely land, cannot safely land, or both. The safe and unsafe areas can be used to generate a hazard map 209.

Depending on the embodiment, the hazard map can show areas that are known to be safe while assuming all others are unsafe and can show areas that are known to be unsafe and leave the other areas undetermined. In general, the hazard map can show any combination of one or more of the following: known safe areas, known unsafe areas, known but neutral areas, and unknown areas. An area is known safe if one or more of the safety criteria positively indicate that it is safe and none of the safety criteria positively indicate that it is unsafe. An area is unsafe if any of the safety criteria positively indicate that the area is unsafe. An area is known but neutral if it is covered by the topology measurement, but does not match any of the safety criteria. An area is unknown if the topology data does not include the area or the topology data is deficient by being too noisy, too low a resolution, etc. An example of an unknown area is one that is shadowed from the transmitted signal 202 by a mountain, cliff edge, or the near wall of a crater.

The hazard map 209 can be fed directly to a presentation module 214 that provides it as a map display 215 to a user 216. Alternatively, the hazard map can be combined with a surface map 211 by a map combiner 212 to produce a color coded surface map 213 that is displayed to the user 216.

Figure 3:
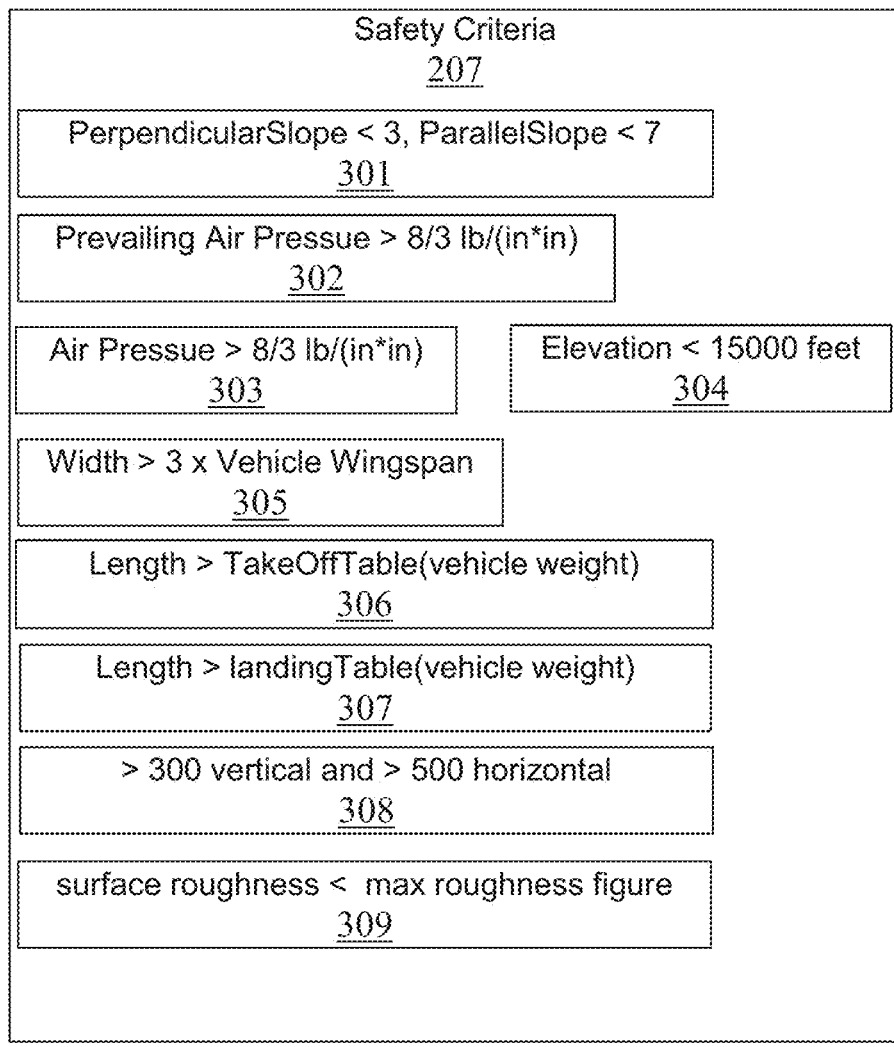
FIG. 3 illustrates safety criteria in accordance with aspects of the embodiments.

FIG. 3 illustrates safety criteria 207 in accordance with aspects of the embodiments. A slope criterion 301 can indicate that the terrain has a slope that permits safe landing. The slope can be represented by a single number indicative of the difference in altitude across a given distance. Here, two numbers are used, one for slope perpendicular to the direction of travel and a different one for slope parallel to the direction of travel. One single number can be useful for vehicles having a more or less vertical landing capability such as a helicopter or parachute. The two numbers can be useful for a winged vehicle or other vehicle that has forward velocity as it lands. An interesting capability is that the hazard map can be continuously updated as the user selects different approach vectors into an area. Hopefully, one of the approach vectors will indicate that it is safe to land if the vehicle approaches the area along that particular vector. The pilot then simply lies to an appropriate position, approaches along the vector, and lands safely, perhaps while paying careful attention to the hazard map to ensure that new data doesn't indicate an unsafe landing.

The prevailing air pressure criterion 302 can be a relaunch criterion. For example, a helicopter can land safely, but be unable to immediately lift off because the air pressure is too low. Knowing the prevailing air pressure, the pilot waits until the air pressure climbs into a suitable range and then takes off. Elevation criterion 304 and air pressure criterion 303 are based on the vehicles performance envelope. The performance envelope is often expressed as a maximum altitude although the reality is that the air pressure is the determining factor. The vehicles weight, including fuel and cargo calculations, can be used to adjust criteria based on the vehicles performance envelope.

A size criterion such as 305 can ensure that the pilot does not attempt to land in too narrow an area, thereby breaking off wings, rotors, or other necessities.

A performance based take off 306 and landing criterion 307 can show that a runway or landing strip is long enough based on the vehicles weight. Interestingly, an airplane pilot can dump fuel, thereby lightening the aircraft, and observe a landing strip transition from red (unsafe) to green (safe) as the hazard display is continuously updated. Here, the analysis module is consulting a table that indicates safe runway lengths as a function of gross weight.

A performance based relaunch criterion 308 can show that a runway is too short, based on the vehicles gross weight, for the aircraft to take off again. The pilot in this scenario should be provided an opportunity to input different cargo and fuel loads.

A safety criterion can indicate the closest that a vehicle should get to another vehicle. The illustrative example indicates an envelope of no closer than 300 feet vertically and no closer than 500 feet horizontally. For example, the other vehicle can be a moving airplane. Based on the envelope surrounding that airplane, the geographic area on the other side is considered unsafe for landing because attempting to land could involve crashing into the airplane. With patience, the airplane should clear the area and the continuously updating hazard map will indicate safe to land.

A roughness based criterion 309 can be used for terrain that is rough, but without out-of-limits slope. An example of this is a potholed or bombed airstrip. Some aircraft can handle potholes up to a certain size, others will break. As such, this is a performance based criterion.

Figure 4:
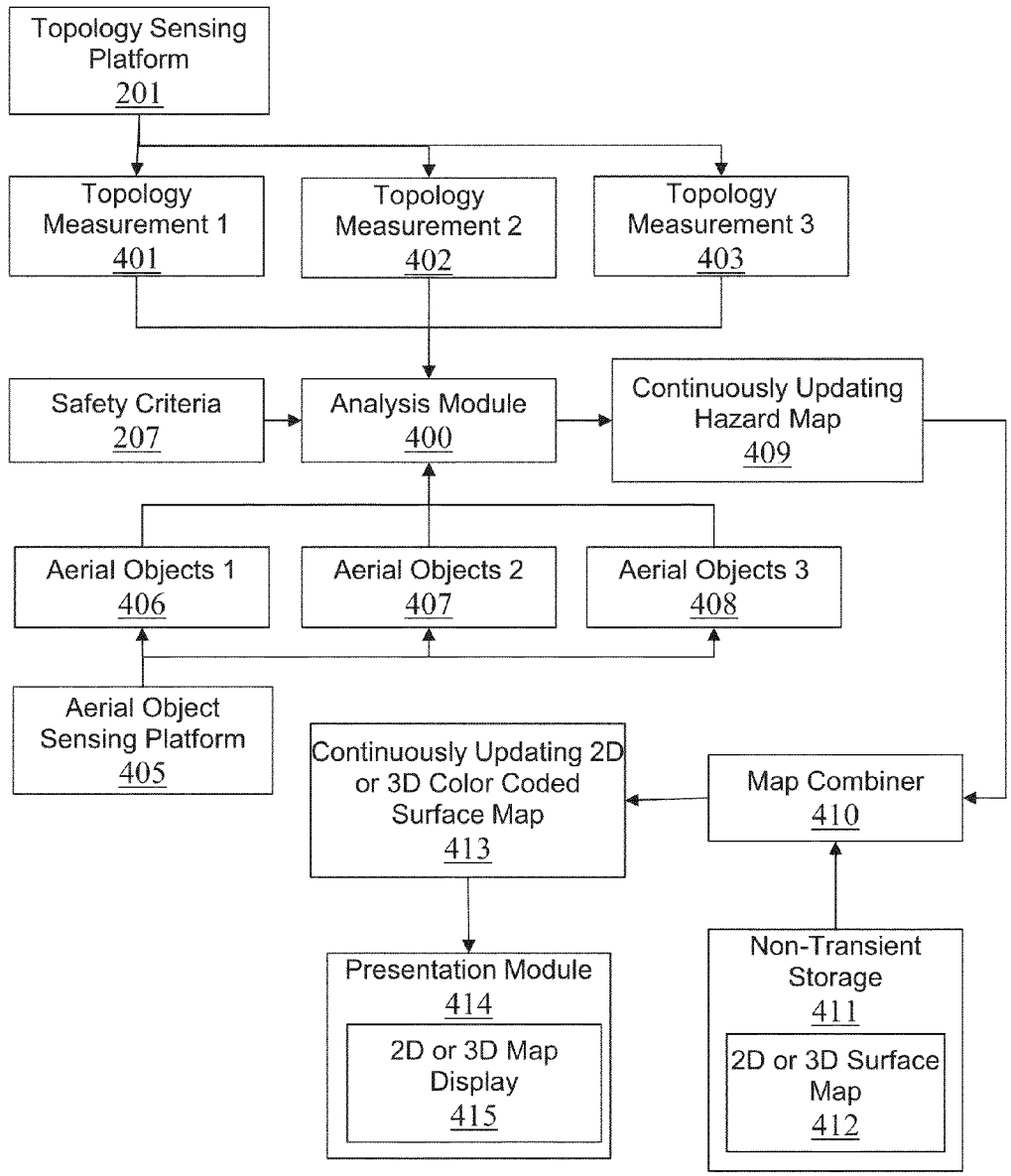
FIG. 4 illustrates a high level block diagram of a system that is continuously updating a hazard map in accordance with aspects of the embodiments.

FIG. 4 illustrates a high level block diagram of a system that continuously updates a hazard map 409, in accordance with aspects of the embodiments. The topology sensing platform 201 can continuously obtain topology measurements 401, 402, 403. Similarly, an aerial object sensing platform 405 can continuously locate and report aerial object locations 406, 407, 408. Here, three consecutive measurements are shown, although in practice there is a reality that there is a large and indefinite number as the sensing platforms produce streams of measurements. The analysis module 400 receives the measurement 401-403, 406-408 and interprets them based on the safety criteria to produce a continuously updating hazard map 409. In the non-limiting example of FIG. 4, the map combiner 410 receives the continuously updating hazard map 409 and combines it with a surface map 412 to produce a continuously updating color coded surface map 413. The presentation module can display the continuously updating color coded surface map to a user on a map display 415. In this manner, the user, often the pilot can watch the color coded map 413 change to reflect changing conditions. The color codes of the color coded map can indicate that a geographic area has become unsafe to land in while another has become safe.

The surface map 412 in the example is stored in non-transitory memory and can be a two dimensional or a three dimensional map. An example of a two dimensional map is a standard map showing ground features and possibly labeling them such as an air chart or road map. A three dimensional map is similar to a two dimensional map with the exception of also having elevation data and, in some cases, the vertical dimensions or even 3D models of structures and other identifiable features. Given a 3D surface map, the color coded map can also be 3D and the map display can be a 3D display. The 3D data can be collapsed to two dimensions anywhere along the rendering chain.

Figure 5:
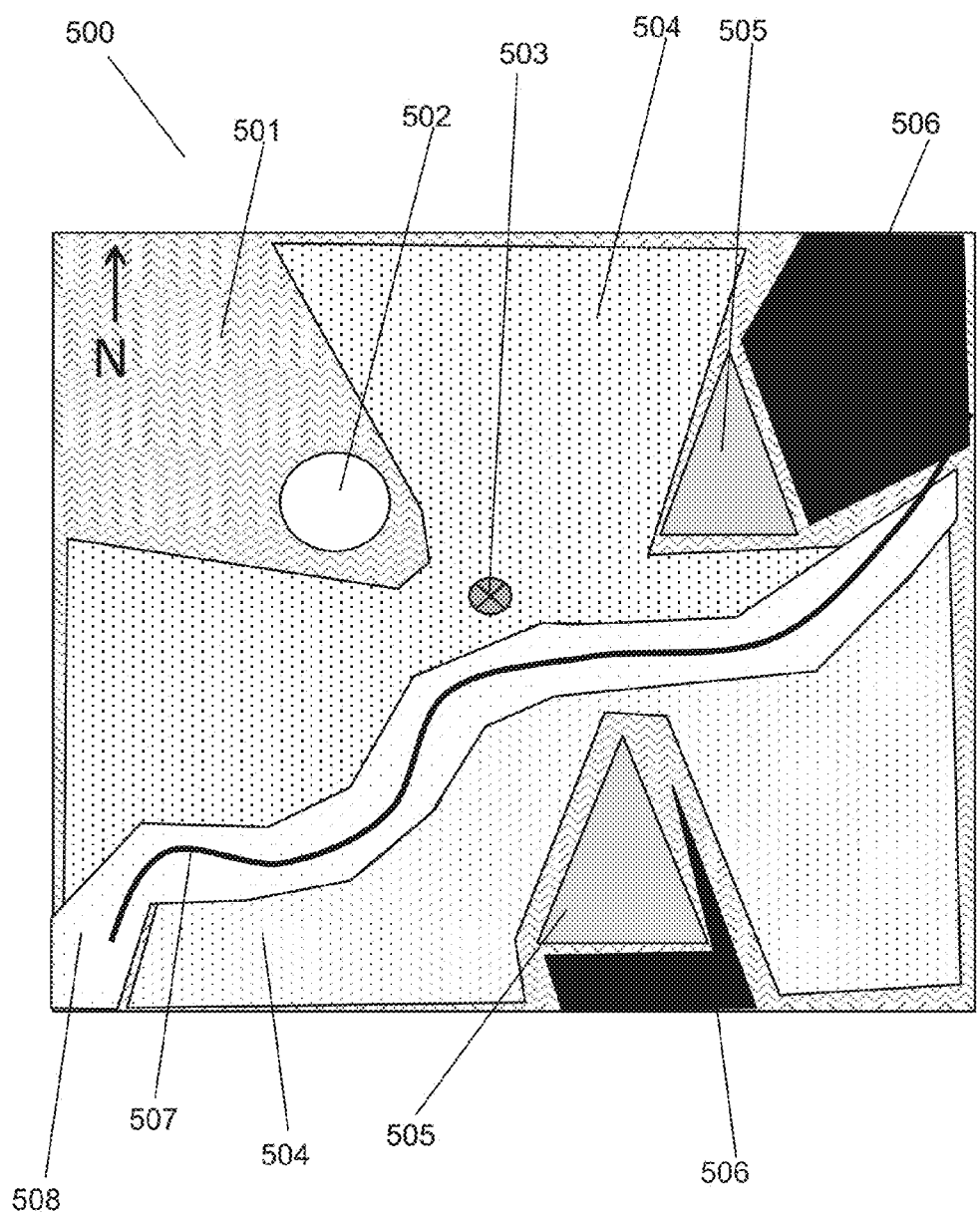
FIG. 5 illustrates a two dimensional hazard map in accordance with aspects of the embodiments.

FIG. 5 illustrates a two dimensional hazard map 500 in accordance with aspects of the embodiments. The illustrative hazard map uses fill patterns instead of colors in order to comply with the rules for patent application submissions. An aerial vehicle 503 is shown in the center of the map, conceptually, this vehicle is an eight rotor drone aircraft that can take off or land vertically. According to the hazard map, many areas 501 are unsafe to land in, but many more are safe 504. A hot air balloon 502 is blocking a large swath of terrain that the drone can't reach without getting too close to the balloon. Invading the balloons safety envelope can result in angry balloonists, FAA fines, and possibly even an aerial mishap. Two buildings 505 are keeping the drone from observing terrain 506 which is color coded as black to indicate that the terrain is shadowed by the buildings 505. The shadowed terrain 506 exemplifies unknown terrain. The area immediately adjacent to the buildings 505 is coded as unsafe because the drone cannot safely approach that close to buildings 505 and cannot land on vertical surfaces. A highway 507 runs through the area and the area within 30 meters of the highway is marked neutral 508.

An aspect of embodiments is that some criteria positively indicate safe, positively indicate unsafe. It cannot be inferred that every area is unsafe unless marked safe and vice versa. In practice, the conservative approach is to always assume unsafe unless known safe, but in emergencies it is good to know what might be safe without being sure. For example, a safety criteria can be "safe if greater than 30 meters from a highway." This criterion gives a positive indication of safe for geographic areas more than 30 meters from a highway. If there is no criterion for "unsafe if less than 30 meters from a highway," then the area around the highway is neutral. As such the area with 30 meters of the highway is mostly marked neutral 508 because no criterion positively marks it as safe and none positively marks it as unsafe. Recall that an area is unsafe to land in if any criterion positively marks it as unsafe. An area is safe if it is not positively marked unsafe and it is positively marked safe. An area is neutral if it is not positively marked safe or unsafe. Finally, an area is marked unknown if there is insufficient data for determining landing safety.

The embodiment and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those skilled in the art following the reading of this disclosure, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A system comprising:
    a topology sensing platform that produces a topology measurement of a surface along a vehicle's flight path;
    safety criteria comprising at least one topological criterion wherein each topological criterion specifies terrain characteristics for safe landing or unsafe landing;
    an analysis module that produces a two dimensional hazard map by applying the safety criteria to the topology measurement wherein the two-dimensional hazard map is color coded to indicate geographical areas that are safe to land on and to indicate geographical areas that are not safe to land on; and
    a presentation module that presents the two-dimensional hazard map to a user.

2. The system of claim 1 wherein the vehicle's physical properties determine at least one of the topological criteria.

3. The system of claim 1 wherein the at least one topological criterion is a slope criterion such that geographical areas that are too sloped for safe landing are color coded as geographical areas that are not safe to land on.

4. The system of claim 1 wherein the at least one topological criterion is a relaunch criterion indicating that the vehicle is likely to be capable of taking flight if landed in a geographical area meeting the relaunch criterion.

5. The system of claim 4 wherein the relaunch criterion is based on elevation.

6. The system of claim 4 wherein the relaunch criterion is based on prevailing air pressure.

7. The system of claim 1 further comprising an additional color coding to indicate geographical areas for which there is no topological measurement.

8. The system of claim 1 further comprising an air hazard sensing system that detects a moving aerial hazard in the vicinity of the vehicle, wherein the safety criteria comprises an aerial exclusion envelope, and wherein the hazard map is color coded unsafe in those areas that cannot be reached without flying through the aerial exclusion envelope for the aerial hazard.

9. The system of claim 8 wherein the hazard map is updated as the aerial hazard moves relative to the vehicle and as additional topology measurements are produced by the topology sensing platform.

10. The system of claim 9 wherein the vehicle's physical properties determine one of the at least one topological criterion, wherein the at least one topological criterion comprises a slope criterion such that geographical areas that are too sloped for safe landing are color coded as geographical areas that are not safe to land on, wherein the at least one topological criterion comprises a relaunch criterion indicating that the vehicle is likely to be capable of taking flight if landed in a geographical area meeting the relaunch criterion, wherein the relaunch criterion is based on elevation and on prevailing air pressure, and the system further comprising:
    an additional color coding to indicate geographical areas for which there is no topological measurement; and
    a surface map produced from the topology measurement wherein the two-dimensional hazard map is a color coded version of the surface map.

11. A system comprising:
    a topology sensing platform that produces a topology measurement of a geographical surface in front of a vehicle and along a flight path wherein the flight path is the vehicle's flight path;
    a surface map of a geographical area comprising the geographical surface;
    safety criteria comprising one or more topological criterion;
    an analysis module that produces a hazard map by color coding the surface map wherein the color coding is determined by applying the safety criteria to the topology measurement, wherein the hazard map is color coded to indicate geographical areas that are safe to land on and to indicate geographical areas that are not safe to land on; and
    a presentation module that presents the hazard map as an overlay to a user.

12. The system of claim 11 wherein the surface map is a two dimensional surface map.

13. The system of claim 11 wherein the hazard map is a two dimensional hazard map.

14. The system of claim 11 wherein the surface map is a three dimensional surface map.

15. The system of claim 14 wherein the hazard map is a two dimensional hazard map.

16. The system of claim 14 wherein the hazard map is a three dimensional hazard map and the presentation module presents the hazard map on a three-dimensional display.

17. The system of claim 11 wherein the surface map is a three dimensional surface map, wherein the hazard map is a two dimensional hazard map, wherein the vehicle's physical properties determine at least one of the topological criteria, wherein the topological criteria comprises a slope criterion such that geographical areas that are too sloped for safe landing are color coded as geographical areas that are not safe to land on, wherein the topological criteria comprises a relaunch criteria indicating that the vehicle is likely to be capable of taking flight if landed in a geographical area meeting the relaunch criteria, wherein the relaunch criteria is based on elevation and on prevailing air pressure, and the system further comprising:
    an additional color coding to indicate geographical areas for which there is no topological measurement; and
    an air hazard sensing system that detects a moving aerial hazard in the vicinity of the vehicle, wherein the safety criteria comprises an aerial exclusion envelope, wherein the hazard map is color coded unsafe in those areas that cannot be reached without flying through the aerial exclusion envelope for the aerial hazard, and wherein the hazard map is updated as the aerial hazard moves relative to the vehicle and as additional topology measurements are produced by the topology sensing platform.

18. A method comprising:
    producing a topology measurement of a surface along a vehicle's flight path;
    producing a two dimensional hazard map by applying safety criteria to the topology measurement, wherein the safety criteria comprises one or more topological criterion wherein each topological criterion specifies terrain characteristics for safe landing or unsafe landing, wherein the two-dimensional hazard map is color coded to indicate geographical areas that are safe to land on and to indicate geographical areas that are not safe to land on; and providing a presentation of the two-dimensional hazard map to a user.

19. The method of claim 18 further comprising:

producing additional topology measurements as the vehicle travels along the flight path;

updating the two dimensional hazard map as the additional topology measurements are produced; and updating the presentation as the two dimensional hazard map is updated.

20. The method of claim 19 further comprising:

an additional color coding to indicate geographical areas for which there is no topological measurement;

an air hazard sensing system that detects a moving aerial hazard in the vicinity of the vehicle, wherein the safety criteria comprises an aerial exclusion envelope, wherein the hazard map is color coded unsafe in those areas that cannot be reached without flying through the aerial exclusion envelope for the aerial hazard, and wherein the hazard map is updated as the aerial hazard moves relative to the vehicle; and a surface map produced from the topological measurement wherein the surface map is a three dimensional surface map, wherein the hazard map is a two dimensional hazard map, wherein the vehicle's physical properties determine at least one of the topological criteria, wherein the topological criteria comprises a slope criterion such that geographical areas that are too sloped for safe landing are color coded as geographical areas that are not safe to land on, wherein the topological criteria comprise a relaunch criteria indicating that the vehicle is likely to be capable of taking flight if landed in a geographical area meeting the relaunch criteria, wherein the relaunch criteria is based on elevation and on prevailing air pressure.

* * * * *